United States Patent
Govorkov et al.

[11] Patent Number: 6,002,697
[45] Date of Patent: Dec. 14, 1999

[54] DIODE PUMPED LASER WITH FREQUENCY CONVERSION INTO UV AND DUV RANGE

[75] Inventors: Sergei V. Govorkov, Boca Raton, Fla.; Uwe Stamm; Wolfgang V. Zschocka, both of Göttingen, Germany; Thomas Schröder, Jera, Germany

[73] Assignee: Lambda Physik GmbH, Göttingen, Germany

[21] Appl. No.: 09/139,214

[22] Filed: Aug. 24, 1998

Related U.S. Application Data

[60] Provisional application No. 60/080,611, Apr. 3, 1998.

[51] Int. Cl.⁶ .................................................. H01S 3/04
[52] U.S. Cl. ................................. 372/34; 372/22
[58] Field of Search .......................... 372/34, 22

[56] References Cited

U.S. PATENT DOCUMENTS

| | | | |
|---|---|---|---|
| 3,858,056 | 12/1974 | Melamed et al. | 372/34 |
| 5,093,832 | 3/1992 | Bethune et al. | 372/34 |
| 5,365,366 | 11/1994 | Kafka et al. | 372/22 |
| 5,638,388 | 6/1997 | Nighan, Jr. et al. | 372/22 |
| 5,847,861 | 12/1998 | Kafka et al. | 372/22 |
| 5,854,802 | 12/1998 | Jin et al. | 372/22 |
| 5,898,718 | 4/1999 | Mohatt et al. | 372/34 |

OTHER PUBLICATIONS

"Effects of Moisture on CLBO", OSA Topics, vol. 10 *Advanced Solid State Lasers*, C.R. Pollock and W.R. Bosenberg eds., OSA, 1997.

*Primary Examiner*—Leon Scott, Jr.
*Attorney, Agent, or Firm*—Limbach & Limbach LLP

[57] ABSTRACT

A solid state laser is provided including a rare earth-doped YAG, YLF, YVO, GSGG, YALO or GdVO oscillator crystal, at least one laser diode pumping source, a Q-switch short pulse generator, a frequency doubling stage and frequency quadrupling or quintupling stages. The frequency quadrupling or quintupling stages include a nonlinear optical crystal such as CLBO, BBO or LBO built into a housing. The housing is sealed off to prevent external moisture and other atmospheric impurities from accessing the crystal at its interior. The housing interior is configured for purging with one or more external inert gases or dry air through valve controls. The housing is equipped with a mechanism for controlling the temperature of the interior of the housing, and consequently for controlling the temperature of the crystal. The temperature controlling mechanism enables heating and cooling of the crystal, as well as maintaining the crystal at a constant selected temperature. The housing includes optical windows transparent for input and output radiation.

34 Claims, 4 Drawing Sheets

Means of angular adjustments of crystal cell (to page 9)

5a – cell containing crystal, 5b – micrometer screw, 5c – hard metal pad, 5d – spring, 5e – hard metal balls, 5f – incoming Brewster's window, 5g – output window, 5h – screws attaching cell holder to the laser base plate.

Two alternative arrangements (to page 10)

1. Purging arrangement: 6a – cell, 6b – exhaust valve, 6c – purging valve, 6d – flow controller (orifice), 6e – pressure regulator, 6f – cylinder with gas.

2. Vacuum arrangement: 7a – cell, 7b – vacuum valve, 7c – vacuum pump, 7d – exhaust.

ns of solid state laser light below 300 nanometers
DIODE PUMPED LASER WITH FREQUENCY CONVERSION INTO UV AND DUV RANGE This Application claims the benefit of U.S. Provisional Application No. 60/080,611 filed Apr. 3, 1998.

BACKGROUND OF THE INVENTION

1. Field of the Invention

The present invention relates to a diode pumped laser, and particularly to a frequency multiplied diode pumped solid state laser wherein a non-linear, frequency doubling crystal is located in an inert gas purged cell having precise temperature control at relatively high temperatures.

2. Discussion of the Related Art

Diode pumped solid state lasers are efficient, compact and reliable sources of high beam quality optical radiation. The group of solid state lasers includes most commonly the neodymium laser, and also ruby lasers, but there are many others. Triply ionized neodymium is the active material of neodymium lasers. In a crystal, the neodymium is a substitutional dopant (most commonly for yttrium). Neodymium may also be incorporated into a glassy matrix. Neodymium may further form part of a crystal, such as with neodymium pentaphosphate $NdP_5O_{14}$. The most common host for neodymium is yttrium aluminum garnet (YAG), or $Y_3Al_5O_{12}$. Other common neodymium hosts include yttrium lithium fluoride (YLF), or $YLiF_4$; gadolinium scandium gallium garnet (GSGG), or $Gd_3Sc_2Ga_3O_{12}$; yttrium aluminate (YALO or YAP), or $YALO_3$; and yttrium vanadate (YVO), or $YVO_4$. Neodymium may also be hosted by phosphate and silicate glasses. Some more recently discovered neodymium host materials holding promise in the solid state laser field include gadolinium vanadate (GdVO), or $GdVO_4$; and yttrium vanadate (YVO), or $YVO_4$. Ytterbium (Yb) is also being doped into such crystals as YAG, YLF and YVO. Gadolinium vanadate crystals may also be doped with thulium (Tm) or thulium-holmium (Tm,Ho), rather than with neodymium. Titanium doped sapphire (Ti:$Al_2O_3$) and erbium doped YAG (Er:YAG) are also coming into vogue in the solid state laser field.

Table I shows the principal lasing wavelengths for many common solid state lasers. As may be inferred or is apparent from an inspection of Table I, the principal wavelengths of lasing action for most solid state lasers is in the infrared (IR) spectral range. However, it is desirable to convert solid state lasers to lase yin the ultraviolet (UV) spectral range. This frequency conversion is achieved with high efficiency by means of nonlinear optical conversion using nonlinear optical crystals. These crystals are normally arranged in the laser setup within the laser resonator for CW systems and outside the laser resonator for pulsed systems.

Commonly employed nonlinear conversion processes are harmonic generation, such as second and fourth harmonic generation (SHG and FHG, respectively), and sum frequency generation (SFG). Other techniques include Raman shifting, sum and difference frequency mixing and parametric conversion. Harmonic generators may be packaged with the laser. Other techniques such as the above-mentioned ones are normally done using separate accessories. Many nonlinear optical crystals are available for doubling of the light frequency of solid state lasers thus converting the light into the visible range. However, efficient quadrupling and quintupling of laser radiation present significant challenges due to a very limited selection of nonlinear crystals and a necessity for special operating conditions for efficient and long-lasting operation.

Very few nonlinear crystals are available for nonlinear conversions of solid state laser light below 300 nanometers (nm) due to their transparency, non-linear coefficients and adequate birefringence. Of these, beta barium borate (BBO), or β-$BaB_2O_4$, lithium borate (LBO), or $LiB_3O_5$, and Cesium Lithium Borate (CLBO), or $CsLiB_6O_{10}$, each allow efficient conversion to the shortest wavelengths. CLBO is especially suitable for short wavelength conversion due to its small walk-off angle, and large angular, spectral and temperature bandwidth, leading to more efficient and robust conversion performance. However, CLBO is quite hygroscopic, or sensitive to moisture present in the atmosphere. This results in refractive index distortion and "fogging" of crystal optical surfaces. It has been shown that temperature annealing of the crystal and operation at elevated temperatures significantly reduces index distortion effects. See Taguchi, A., Miyamoto, A., Mori, Y., Haramura, S., Inoue, T., Nishijima, K., Kagebayashi, Y., Sakai, H., Yap, Y. K., and Sasaki, T., *Effects of Moisture on CLBO*, OSA Topics, in *Advanced Solid State Lasers*, C. R. Pollock and W. R. Bosenberg, eds., OSA, Vol. 10 (1997).

Practical implementation of the reduced index distortion operations discussed in Taguchi et al. is however complicated due to the tendency of the crystal to absorb and release significant amounts of moisture upon cooling and heating, respectively. This tendency causes damage to optical surfaces of the crystal when it is operated in an enclosed cell, which in turn is necessary for protection from atmospheric moisture. Cooling and heating cycles are unavoidable due to power interruptions, for example, when the device is being transported. Additionally, the temperature of the crystal must be precisely controlled since the phase matching angle for the nonlinear conversion is dependent on the temperature.

SUMMARY OF THE INVENTION

The present invention solves the aforementioned problems by providing means for removing moisture from a housing enclosing a non-linear crystal by purging the housing interior with an inert gas or dry air and/or evacuating the housing while the crystal is being cooled, heated or maintained at a constant temperature. By this arrangement, damage to the optical surfaces from both external sources and from release of moisture from within the crystal itself during operation can be minimized. The present invention further provides means for precisely maintaining the cell at a constant elevated temperature to optimize the phase matching angle for the nonlinear conversion. The housing includes optical windows transparent for input and output radiation.

DETAILED DESCRIPTION OF THE PREFERRED EMBODIMENT

Figure 1:
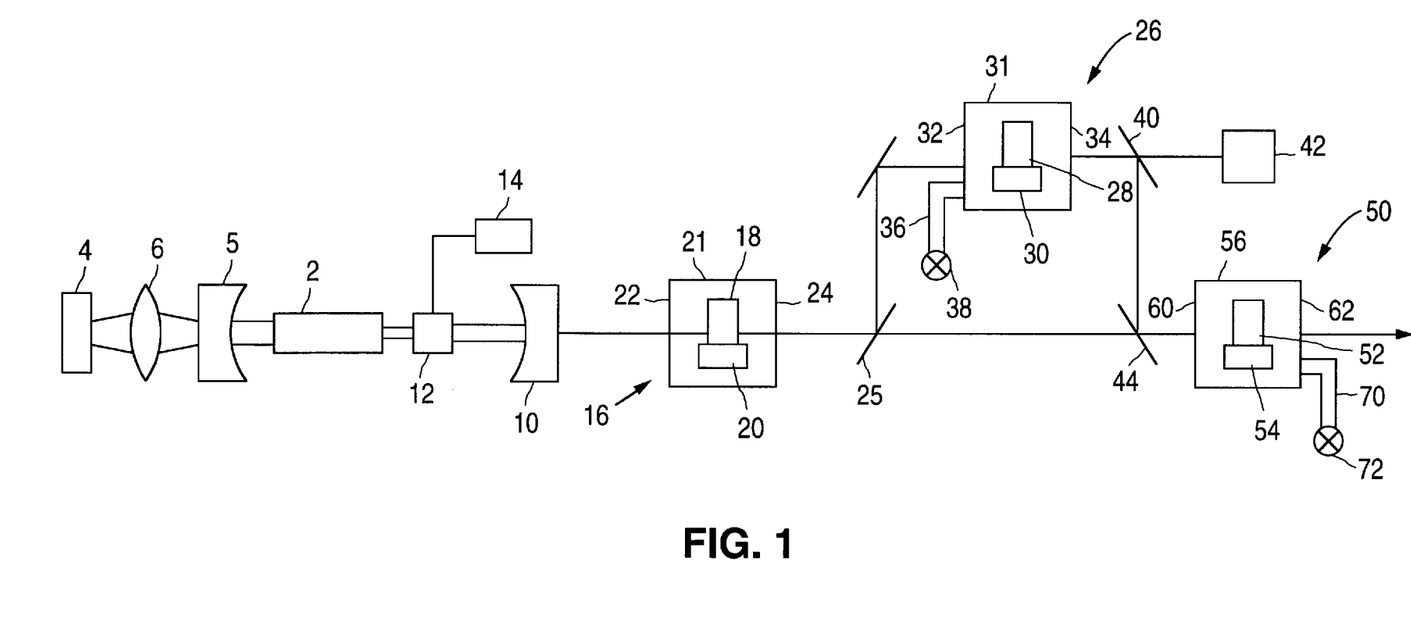
FIG. 1 shows a solid state laser setup with frequency conversion stages according to a preferred embodiment of the present invention.

Turning to FIG. 1, a laser according to a preferred embodiment of the present invention includes a solid state gain medium 2. The preferred gain medium 2 is a rare earth doped solid state gain medium. The gain medium may be YAG, YLF, YVO or another medium selected, e.g., from those described above. The rare earth dopant may be neodymium, ytterbium, or another dopant selected, e.g., from those described above. The gain medium and dopant may also be selected from several media and dopants either developed or being developed in the expanding solid state laser field.

The laser includes at least one and preferably several pumping laser diodes 4. Although not preferred, broad spectrum light sources, continuous tungsten arc lamps, or pulsed flash lamps can be used to achieve pumping action. The pumping laser diodes produce light relied upon to raise the rare earth dopant, e.g., neodymium, atoms of the crystal to an excited energy level. Since ground state neodymium ions of, e.g., a Nd-YAG laser absorb most strongly at pump bands near 0.73 and 0.8 micrometers ($\mu$m), the preferred pumping transitions elevate ground state $^4I_{9/2}$ neodymium ions to excited states $^4F_{5/2}$, $^3H_{9/2}$ (0.8 $\mu$m absorption) and $^4S_{3/2}$, $^4F_{7/2}$ (0.73 $\mu$m absorption). From these excited energy states, fast, nonradiative decay to an upper laser level $^4F_{3/2}$ occurs producing a population inversion between the upper (metastable) level and a lower laser level $^4I_{11/2}$. Radiative decay from the upper level to the lower level is the main laser transition and produces light of around 1.06 $\mu$m. From the lower level, a fast nonradiative decay to the ground state occurs. An example of a pumping diode laser source 4 is an AlGaAs semiconductor diode laser.

The pumping diode laser 4 is displaced from the end of the Nd-YAG rod 2. Diode laser pumping can also be from the side of the rod 2. Light around 810 nm is emitted from an AlGaAs semiconductor laser 4, as shown, displaced from a first end of the Nd-YAG rod 2. The emitted light from the semiconductor laser 4 is focused by a lens 6 through one resonator mirror 5 and into the rod 2. The resonator mirror 5 has an optical coating which is highly reflective of light around 1.06 $\mu$m, and is highly anti-reflective around 0.81 $\mu$m. Virtually all of the 0.81 $\mu$m light is absorbed in the laser rod 2. An output coupler 10 is shown displaced from the second end of the rod 2 further along the optical path of the system.

A technique for producing short energetic pulses is further incorporated into the preferred setup. The preferred technique is Q-switching, but such techniques as cavity dumping, modelocking and external shuttering (either mechanically or through electro- or acousto-optic modulation) are possible. Of the possible arrangements for incorporating Q-switching into the preferred setup, active Q-switching is preferably performed by a modulator 12 inserted into the laser cavity. The modulator 12 is driven by a modulator driver 14. Active Q-switching may also be performed by using a rotating mirror or prism as the rear cavity mirror. Passive Q-switching may be performed by inserting a lossy element, such as a saturable dye cell or a solid state absorber such as $Cr^{4+}$:YAG, into the cavity that becomes transparent once intracavity power exceeds a certain level.

The modulator 12 responsible for Q-switching in the preferred setup changes the fraction of incident light it transmits in response to external control signals, relying either on acousto-optic or electro-optic interactions in the modulator crystal. Mechanical operation of a shutter or aperture is also possible, but not preferred. For acousto-optic modulation, an acoustic wave in the material of the modulator 12 sets up a pattern of density variations that functions as an effective diffraction grating which diffracts a fraction of the light entering the material, depending on the wave strength. Exemplary materials include quartz, lead molybdate and tellurium dioxide. For electro-optical modulation, an electric field varies the birefringence properties of the modulator material. When incident light is linearly polarized, the birefringent material modulates the strength of the output beam by rotating the polarization of transmitted light. Exemplary materials include potassium dihydrogen phosphate, beta-barium-borate (BBO), related compounds including ammonium dihydrogen phosphate, deuterium substituted potassium and ammonium phosphate compounds, and nitrobenzene in liquid form.

The gain medium, or oscillator, 2 preferably emits laser pulses with durations in the range from one to several hundred nanoseconds (ns). The repetition rate of the emitted pulses is preferably from one Hertz (Hz) to 100 kHz. A silicate glass amplifier may be used with a Nd-YAG oscillator and a phosphate glass amplifier may be used with a Nd-YLF oscillator.

The radiation is first frequency doubled to around 532 nm at a frequency doubling stage 16 by passing through a nonlinear crystal 18 such as LBO, BBO, KTP or CLBO. The nonlinear crystal 18 is arranged on a temperature stabilized crystal holder 20 which is placed into a hermetically sealed housing 21. Means for angularly adjusting the crystal orientation (see FIG. 5) with respect to the incident beam are also provided.

The housing 21 is equipped with optical windows 22 and 24 that are transparent to the input and output radiation of the housing 21, respectively. When a Nd:YAG laser is used as the radiation source, the input wavelength of the housing 21 is 1064 nm and the output wavelength is 532 nm. To that end, each window 22, 24 is preferably made of fused silica, crystalline quartz, or glass and may alternatively be made of magnesium fluoride or calcium fluoride.

The respective windows 22 and 24 may be aligned at Brewster's angle to the incident beam. Mounting the window 22 and/or 24 at Brewster's angle obviates the need to use antireflective coatings, particularly if only one beam is present, e.g., if only a single 1064 nm beam enters the doubling cell 21 or if only a 532 nm beam enters a quadrupling cell 31 (described below). If a window 22 or 24 is mounted other than at Brewster's angle, antireflection coatings can be used. Where there are two incoming beams at different wavelengths and/or polarization angles, such as with a quintupling cell 56, a window cannot be aligned at Brewster's angle for both wavelengths and/or polarization angles, and if reflection losses cannot be tolerated, then reflection coatings can be used.

The frequency doubling stage 16 is followed by a frequency quadrupling stage 26. A beam splitter 25 is preferably a thin film dielectric coated dichroic mirror and is positioned to reflect most of the second harmonic light while transmitting a majority of the fundamental beam. For example, the beam splitter 25 may function to separate the 532 nm light from the 1064 nm fundamental frequency, by reflecting most of the 532 nm light and transmitting most of the 1064 nm light. The 532 nm light is directed to the quadrupling stage 26. The fundamental frequency light is directed to the frequency quintupling stage 50 (fifth harmonic) discussed below.

Stage 26 (for creating the fourth harmonic), includes a nonlinear crystal 28 such as BBO or CLBO. The nonlinear crystal 28 is arranged on a temperature stabilized crystal holder 30 which is placed into a hermetically sealed housing 31.

The housing 31 is equipped with optical windows 32 and 34 that are transparent to the input and output radiation of the housing 31, respectively. To that end, if the input wavelength of the housing 31 is 532 nm and the output wavelength is 266 nm, then the entry window 32 is preferably made of fused silica, crystalline quartz, or glass and may alternatively be made of magnesium fluoride or calcium fluoride. The exit window 34 is preferably made of quartz, magnesium fluoride ($MgF_2$) or calcium fluoride ($CaF_2$) and may alternatively be made of fused silica.

The respective windows 32 and 34 are preferably oriented at Brewster's angle and no antireflective coating is used. Alternatively, the windows 32 and 34 are oriented to form a low incidence angle and either reflective losses are tolerated or an anti-reflective coating is applied for applicable wavelengths, e.g., around 532 nm and 266 nm. Means of angularly adjusting the orientation of the crystal (see FIG. 5) with respect to the beam path are also provided.

A beam splitter 40 is used to separate the second and fourth harmonic radiation. The second harmonic radiation is directed to a beam dump 42. The fourth harmonic radiation is directed to a beam combiner 44 which redirects the light into quintupling stage 50.

Stage 50 includes a nonlinear crystal 52 such as BBO or CLBO. The nonlinear crystal 52 is arranged on a temperature stabilized crystal holder 54 which is placed into a hermetically sealed housing 56.

The housing 56 is equipped with optical windows 60 and 62 that are transparent to the input and output radiation of the housing 56, respectively. To that end, if the input wavelength of the housing 56 is 266 nm and the output wavelength is 213 nm, then the entry and exit windows 60 and 62 are preferably made of quartz, magnesium fluoride or calcium fluoride and may alternatively be made of fused silica.

The respective windows 60 and 62 are preferably oriented at Brewster's angle to minimize reflection for a first of two incoming beams. An anti-reflective coating for the other beam, which may or may not be orthogonal to the first, may then be applied for the applicable wavelength, e.g., around 1064 nm or 213 nm. Means of angularly adjusting the orientation of the crystal (see FIG. 5) with respect to the beam path are also provided.

Although not shown, a non-linear crystal housing in accord with the present invention may be used for frequency tripling. Radiation of wavelength 532 nm may enter a housing of such a frequency tripling stage, while 355 nm radiation may exit. The housing of the frequency tripling stage would be preferably otherwise configured substantially the same as the frequency doubling housing 21 described above.

Figure 6:
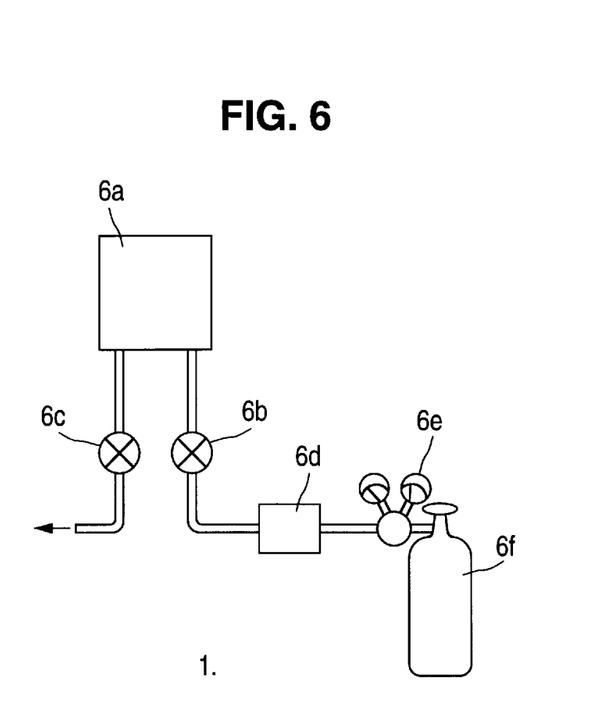
FIG. 6 shows a preferred means for providing a circulation of gases and/or atmosphere within a cell.

Advantageously, the frequency quadrupling or quintupling stages 26 and 50 are additionally configured with means (36 and 70) for purging the associated housing with an inert gas such as argon, neon or helium, or with diatomic nitrogen gas, or dry air. Alternatively, the chamber can be evacuated. The purging means is preferably one or more air-tight and valve-controlled gas lines. Operation of the valve controls (38 and 72) controls whether there is fluid communication between the respective housing and the inert gas source (not shown). A vacuum line (not shown) may also be valve connected to the housing to enable multiple purge/evacuation repetitions to be performed. The gas may be purged through the cell and disposed into ambient air to better remove moisture from the housing 31 or 56, particularly when dry air is used. Two alternative embodiments for performing this function are shown in FIG. 6 (purging arrangement) and FIG. 7 (vacuum arrangement) below.

At least the housings 31 and 56 are sealed such that additional exposure of the inside of the housing to the outside of the housing, other than that which is purposefully enabled through the above valve controls, is minimized. In this way, moisture from the outside is kept from corrupting the atmosphere within the housings and being absorbed by the crystal located therein.

The crystals 28 and 52 of the frequency quadrupling and quintupling stages 26 and 50 may be kept indefinitely in an inert gas atmosphere free from atmospheric moisture contamination, because the only fluid contact the housing has with outside gases is with the one or more inert gases or dry air accessible through the purging means. Moreover, moisture from within the crystal which escapes when the crystal is heated is removable from the housing when the crystal is being heated. In this way, there is minimal moisture content inside the housing to be absorbed by the crystal when and if the crystal is subsequently cooled.

Another aspect of the subject invention is that the non-linear crystals 28 and 52 are preferably maintained at an elevated temperature in the housing using temperature control means. The temperature control means, which can include a heater (30 and 54) and a measurement device located near the crystal (not shown in FIG. 1) permits the crystal temperature to be elevated to 100° C., or more, with a precision of 0.1° C. The temperature measurement device can include a negative temperature coefficient resistor, RTD, thermopile, thermocouple or a photosensor monitoring the angular deviation of the output beam. The elevated temperature may be maintained whether the laser is operating or not. By maintaining the crystals at the elevated temperature, fewer opportunities exist for the crystal to absorb any available moisture upon cooling from such elevated temperature, which is generally the best opportunity for the crystal to do so.

The temperature may be precisely controlled by using a temperature controller which receives information via a feed back loop. A temperature sensor such as an RTD or a thermocouple may generate temperature information to be periodically received and processed by the controller which, in turn, causes the temperature of the crystal to be raised, lowered or maintained based on the temperature information. The controller may receive optical output power information after which it may proceed either to adjust or to maintain the temperature of the crystal. The controller may receive a signal from a dual photosensor which measures an angular deviation of the beam exiting the nonlinear crystal.

Figure 2:
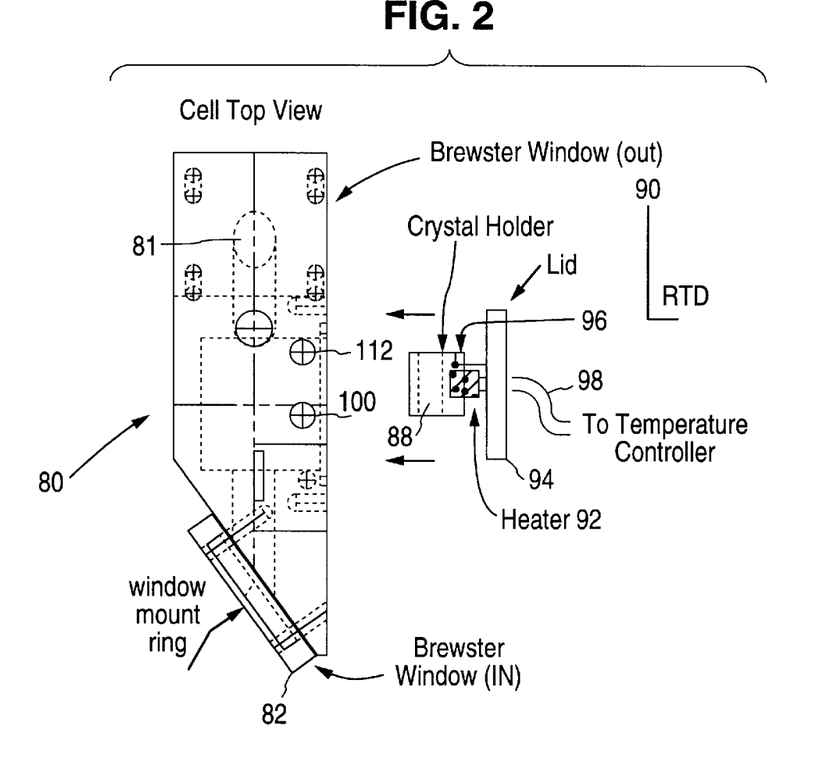
FIG. 2 is a top, exploded view of a preferred housing (cell) for holding a non-linear crystal in accordance with the subject invention.
Figure 3:
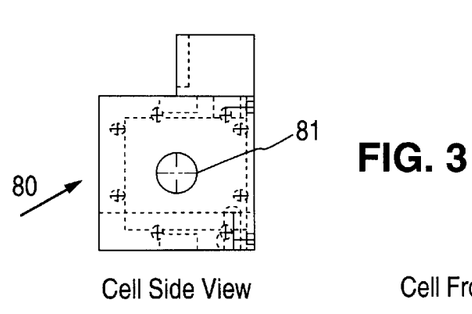
FIG. 3 is a side view of the housing (cell) of FIG. 2 as seen from the bottom of FIG. 2. This view does not include the Brewster window or ring mount shown in FIG. 2.
Figure 4:
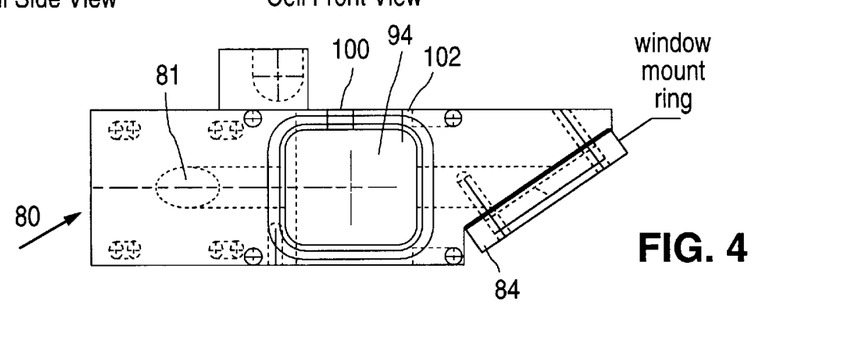
FIG. 4 is a front view of the housing (cell) of FIG. 2.

A housing (cell) 80 of the type which may be used to hold a non-linear crystal 88 in accordance with the subject invention is illustrated in FIGS. 2 to 4. The housing is preferably formed from a solid block of metal. A bore 81 is formed therein to provide a path for the laser beam. A pair of Brewster windows 82 and 84 are mounted to the ends of the housing.

A non-linear crystal 88 is mounted within a metal holder 90. The holder 90 preferably comprises copper. The holder 90 is mounted to a heater 92. The heater 92 is mounted to a lid 94 which is affixed to the housing. A temperature sensor (RTD) 96 is mounted to the holder 90 for monitoring the temperature of the crystal 88. Electrical wires 98 run out of the housing to a temperature controller (not shown).

The housing is further provided with gas inlet and outlet orifices 100 and 102. The orifices are connectable to a gas supply or evacuation pump. These orifices permit the housing to be purged with inert or dry gas or evacuated in order to remove moisture and increase the life of the non-linear crystal.

Figure 5:
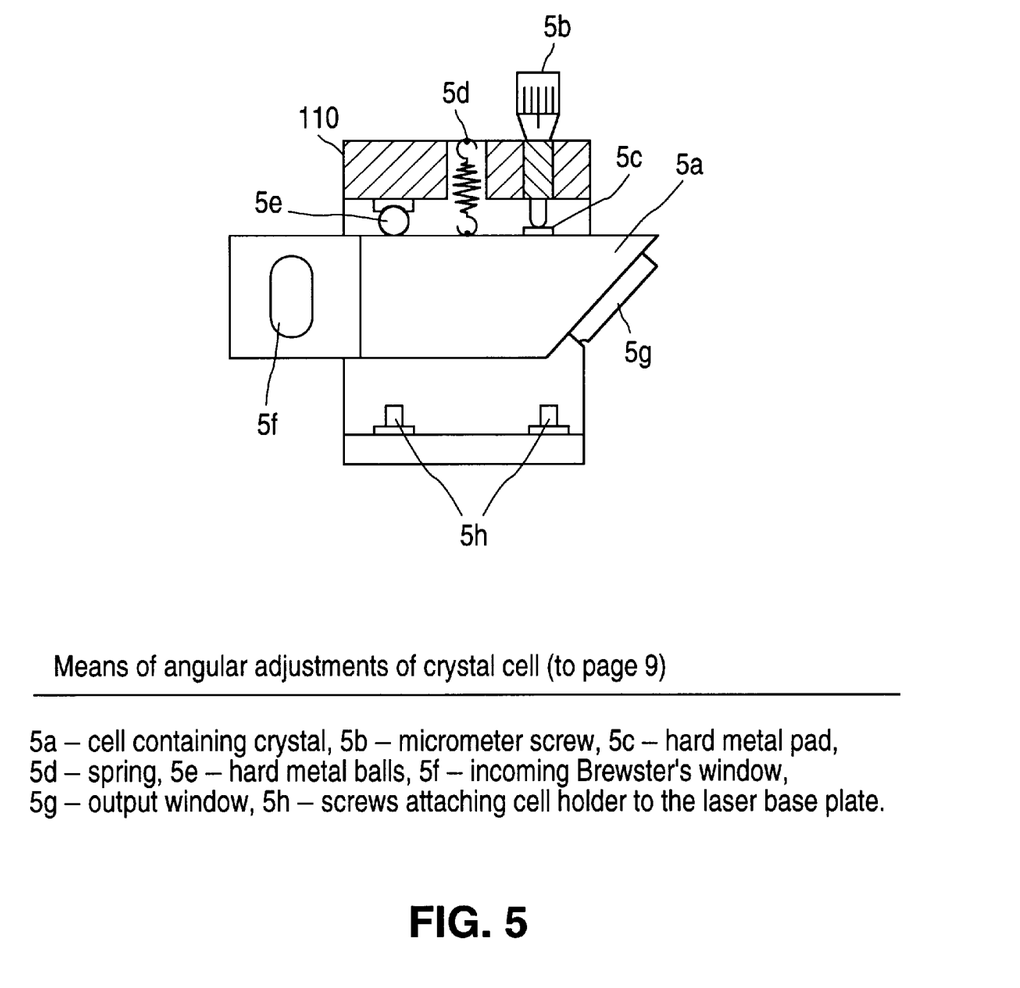
FIG. 5 shows a preferred means for angularly adjusting the crystal orientation within a cell.

FIG. 5 shows a preferred means for angularly adjusting the crystal orientation within the cell 5a. A micrometer screw 5b is pressurably contacted with a hard metal pad 5c which contacts the cell 5a at one end of the cell 5a. The micrometer screw 5b is threadably engaged with a leverage component 110, which lies adjacent to the cell 5a. Near the center of the cell 5a, a spring 5d is attached to the cell and an upper portion of the leverage component 110. A hard metal ball 5e like a ball bearing is contacted with the cell 5a and the leverage component 110 at one end of each. Beam entry and exit windows 5f and 5g are also shown, as are baseplate screws 5h which attach the cell holder to a laser baseplate.

With the hard metal ball 5e acting as a pivot, the micrometer screw 5b applies torque to the cell 5a in the clockwise direction. The complementary spring 5d applies an equivalent torque to the cell 5a in the counter-clockwise direction. As the micrometer screw 5b is turned in one direction or the other, the cell is correspondingly rotated. Consequently, the crystal within the cell is orientationally adjustable and flexibility in crystal orientation is provided.

Figure 7:
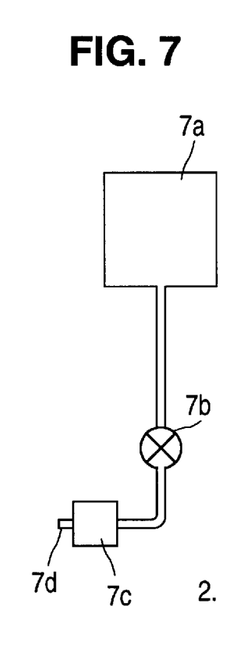
FIG. 7 shows an alternative means for providing a circulation of gases and/or atmosphere within a cell.

FIGS. 6 and 7 show alternative embodiments which provide circulation of gases and the atmosphere within a crystal housing, 21, 31, 56 or 80, e.g. FIG. 6 shows a purging arrangement wherein the cell 6a has an entry and exit port controlled by an entry port valve 6b and an exit port valve 6c, respectively. A flow controller 6d connected before the entry port valve 6b stabilizes a volumetric flow of gas through the entry port 6b into the cell 6a. The gas flow and pressure is monitored and controlled further by a pressure regulator 6e connected to the gas cylinder 6f.

A slight overpressure is maintained wherein a steady flow of gas enters the cell 6a and an equivalent amount of gas exits the cell 6a per unit of time. In this way, moisture and contaminants are removed from the interior of the cell 6a and the crystal is kept free from absorbing and/or being contaminated by them.

FIG. 7 shows a vacuum arrangement wherein a cell 7a is separated by a vacuum valve 7b from a vacuum pump 7c. When the vacuum valve is opened (after the pump is turned on), the cell is pumped down to low pressure. As the pump 7c continues to pump on the interior of the cell 7a, moisture and contaminants are removed and exit the arrangement via the pump exhaust port 7d.

What is claimed is:

1. A solid state laser system, comprising:
   a laser active medium for emitting a beam at a characteristic frequency;
   a resonator;
   one or more frequency conversion stages including a housing containing and controlling an environment around a nonlinear optical crystal, said housing including means for optically accessing said crystal and means for fluidly accessing said environment; and
   means for controlling the temperature of said crystal within said housing.

2. The laser system of claim 1, wherein said fluid access means is a valve-controlled port.

3. The laser system of claim 1, wherein at least one of said stages includes a nonlinear optical crystal for at least quadrupling said characteristic frequency.

4. The laser system of claim 1, wherein said fluid access means provides an avenue for fluids to flow into and out of said housing.

5. The laser system of claim 1, wherein said housing is purgeable by said fluid access means.

6. The laser system of claim 5, wherein said gas is selected from the group of gases including nitrogen, dry air and inert gases such as argon, helium and neon.

7. The laser system of claim 5, wherein said gas is dry air and said dry air is circulated for removing moisture from said environment.

8. The laser system of claim 1, wherein said housing is evacuatable by said fluid access means.

9. The laser system of claim 1, wherein said means for optically accessing said crystal is a first window aligned at Brewster's angle to the beam entering said housing and a second window aligned at Brewster's angle to the beam exiting said housing.

10. The laser system of claim 9, wherein the frequency of the beam exiting the housing is greater by an integral amount than the frequency of the beam entering the housing.

11. The laser system of claim 9, wherein said second window comprises a material selected from the group of materials consisting of $CaF_2$, $MgF_2$, crystalline quartz and fused silica.

12. The laser system of claim 1, said crystal is on an adjustable holder for adjusting an orientation of said crystal.

13. The laser system of claim 12, wherein a temperature of said holder is adjusted and controlled by a temperature controller.

14. The laser system of claim 1, wherein said fluid access means is used to prevent moisture from accessing said crystal.

15. The laser system of claim 1, wherein moisture is removed from said housing by said fluid access means.

16. The laser system of claim 1, wherein the temperature is controllable to within 0.1° C.

17. The laser system of claim 16, wherein the stabilized temperature is approximately 100° C.

18. The laser system of claim 1, wherein said means for adjusting and controlling the temperature includes a feedback loop and a controller receiving temperature information from a temperature sensor.

19. The laser system of claim 1, wherein said means for adjusting and controlling the temperature includes a feedback loop and a controller receiving optical output power information.

20. The laser system of claim 1, wherein said means for adjusting and controlling the temperature includes a feedback loop and a controller receiving a signal from a dual photosensor measuring angular deviation of the beam exiting the housing.

21. A nonlinear optical crystal housing containing and controlling an environment around a nonlinear optical crystal, comprising:
    a pair of optical windows;
    at least one fluid access port; and
    means for adjusting and controlling a temperature of the environment.

22. The nonlinear optical crystal housing of claim 21, said crystal is on an adjustable holder for adjusting an orientation of said crystal.

23. The nonlinear optical crystal housing of claim 22, wherein a temperature of said holder is adjusted and controlled by a temperature controller.

24. The nonlinear optical crystal housing of claim 21, wherein moisture is removed from said housing by said port.

25. The nonlinear optical crystal housing of claim 21, wherein moisture is removed by said fluid access port and thereby prevented from accessing said crystal.

26. The nonlinear optical crystal housing of claim 21, wherein dry air is circulated by said at least one port for preventing moisture from accessing said crystal.

27. The nonlinear optical crystal housing of claim 21, wherein the temperature is controlled to within 0.1° C. by a temperature controller.

28. The nonlinear optical crystal housing of claim 27, wherein the temperature is maintained at approximately 100° C. by said temperature controller.

29. An assembly for improving the performance of a non-linear optical element, comprising:

a sealed chamber for holding the non-linear optical element;

a pair of opposed windows formed in the chamber;

a heater for raising the temperature of the non-linear optical element; and means for removing contaminants from the chamber.

30. An assembly as recited in claim 29 wherein said means for removing contaminants includes a means for evacuating the chamber.

31. An assembly as recited in claim 29 wherein said means for removing contaminants includes a circulation system for purging the chamber with one of an inert gas and dry air.

32. A method of operating a laser system which generates a laser beam and includes a non-linear optical element comprising:

mounting the non-linear optical element in a sealed chamber having input and output windows for transmitting the laser beam;

heating the non-linear optical element; and removing contaminants from the sealed chamber.

33. A method as recited in claim 32 wherein said step of removing contaminants includes evacuating gas from the chamber by applying a vacuum thereto.

34. A method of as recited in claim 32 wherein said step of removing contaminants includes recirculating one of an inert gas and dry air within the chamber.

* * * * *

UNITED STATES PATENT AND TRADEMARK OFFICE
CERTIFICATE OF CORRECTION

PATENT NO. : 6,002,697
DATED : Dec. 14, 1999
INVENTOR(S) : Govorkov, et al.

It is certified that error appears in the above-identified patent and that said Letters Patent is hereby corrected as shown below:

On the front information page, the name of the first inventor is amended to read --Wolfgang Zschocke--; and the city of residence of Thomas Schroder is amended to read --Jena--.

In the specification, at column 1, line 47, "yin" is changed to --in--.

Signed and Sealed this

Twenty-fourth Day of April, 2001

Attest:

NICHOLAS P. GODICI

*Attesting Officer*  *Acting Director of the United States Patent and Trademark Office*